US006533193B2

(12) United States Patent
White

(10) Patent No.: US 6,533,193 B2
(45) Date of Patent: Mar. 18, 2003

(54) SOLUTION INTRODUCTION SYSTEM FOR WATERING INSTALLATIONS

(76) Inventor: Dan White, 13885 Ivywood St. NW., Andover, MN (US) 55304

( * ) Notice: Subject to any disclaimer, the term of this patent is extended or adjusted under 35 U.S.C. 154(b) by 0 days.

(21) Appl. No.: 09/819,403

(22) Filed: Mar. 29, 2001

(65) Prior Publication Data

US 2002/0139866 A1 Oct. 3, 2002

(51) Int. Cl.[7] .................................................. B05B 7/30
(52) U.S. Cl. ........................ 239/318; 239/310; 239/74
(58) Field of Search ................................. 239/310, 201, 239/207, 434, 318, 71, 74, 67; 222/129.2; 137/624.2

(56) References Cited

U.S. PATENT DOCUMENTS

| | | | |
|---|---|---|---|
| 3,833,177 A | 9/1974 | Pasley et al. | 239/201 |
| 5,150,840 A | 9/1992 | Grynkiewicz | 239/305 |
| 5,199,645 A | 4/1993 | Anderson et al. | 239/310 |
| 5,351,290 A | 9/1994 | Baldwin | 239/276 |
| 5,353,990 A | 10/1994 | Williams | 239/313 |
| 5,364,030 A | 11/1994 | Murdock et al. | 239/310 |
| 5,366,159 A | 11/1994 | Childers | 239/310 |
| 5,413,280 A | 5/1995 | Taylor | 239/10 |
| 5,699,827 A | 12/1997 | Delorme et al. | 137/268 |
| 5,772,115 A | 6/1998 | Vaughn | 239/69 |
| 5,775,593 A | 7/1998 | Delorme et al. | 239/310 |
| 5,823,430 A | 10/1998 | Clack, Jr. et al. | 239/10 |
| 5,835,518 A | 11/1998 | Jester | 239/210 |
| 6,314,979 B1 * | 11/2001 | Lips | 137/205.5 |

* cited by examiner

Primary Examiner—Lisa A. Douglas
(74) Attorney, Agent, or Firm—Janet Peyton Schafer

(57) ABSTRACT

A solution fertilizer introduction system for use with automatic lawn watering systems which include an attachment arrangement for introducing liquid fertilizers to underground lawn watering systems. The system may also be used with other chemicals such as weed killers, bug killers or the like that are available in a liquid state for application to lawns. The system includes a quick connect arrangement from the supplied material source to the watering system for removal and replacement of the same and a flow measurer for correlating the additive introduction or flow to water flow with metering and a timer for controlling the additive to produce a desired lawn. A microprocessor may be utilized for control of the additive.

13 Claims, 1 Drawing Sheet

SOLUTION INTRODUCTION SYSTEM FOR WATERING INSTALLATIONS

RELATED APPLICATIONS

Applicant has not filed any nor is he aware of any applications for patent by others which relate to the subject matter of this application.

SPONSORSHIP

The invention disclosed herein has been through the sole efforts of the named inventor and was not made under any, either, Federal or Independent Sponsorship.

FIELD OF THE INVENTION

This invention relates generally to the application of fertilizers and other lawn treatments into watering installations and more specifically to a system for introduction of lawn treatment materials, in liquid form, into lawn watering systems that are normally permanently installed such as underground watering systems although it is equally utilized in such systems that are not necessarily installed underground.

SHORT DESCRIPTION OF THE INVENTION

A system for introducing lawn treatment materials, in liquid or water soluble form, into a lawn watering system or circuit which includes systematic and measured introduction of the same for proper lawn treatment.

The lawn watering system will normally be a permanent installation such as an underground system or, in some instances, elevated systems which are often mounted for movement over the lawn or other area.

In either installation, the amount of water flow is metered and the introduction of the treatment materials is provided with adjustable settings for the proper amount of additive in relation to the water flow as well as the times at which additions are made. A supply of liquid additive is provided which is introduced to the water system through a metering pump with effective check valves being provided to prevent back flow of water into the additive supply. Also included is a quick connect feature for changing the supply to accommodate the introduction of different additives such as weed killers, bug killers and the like.

BACKGROUND AND OBJECTS OF THE INVENTION

Various lawn additive systems have been provided in the past and the ones thought to be most applicable to applicant's concept and structure are provided in the Information Disclosure Citation.

The prior art does disclose such systems but they all appear to have inherent problems of use and provide only inadequate control systems.

It is an object of the applicant's invention to provide a solution introduction system for underground or above ground watering watering installations which incorporates means for determining the flow rate of applied water and introducing the solution in proper amounts with respect to such rate.

It is a further object of the applicant's invention to provide a lawn treatment introduction system for installed watering systems which allows for selective setting of the amount of the treatment material to be provided at proper times and in proper amounts to insure proper lawn care.

It is a further object of the applicant's invention to provide a solution introduction system for permanent lawn watering installations which allows for a variety of feeding or otherwise treating lawns.

These and other objects and advantages of the applicant's invention will more fully appear from a consideration of the accompanying drawing and disclosure.

DESCRIPTION OF A PREFERRED FORM OF THE INVENTION

Figure 1:
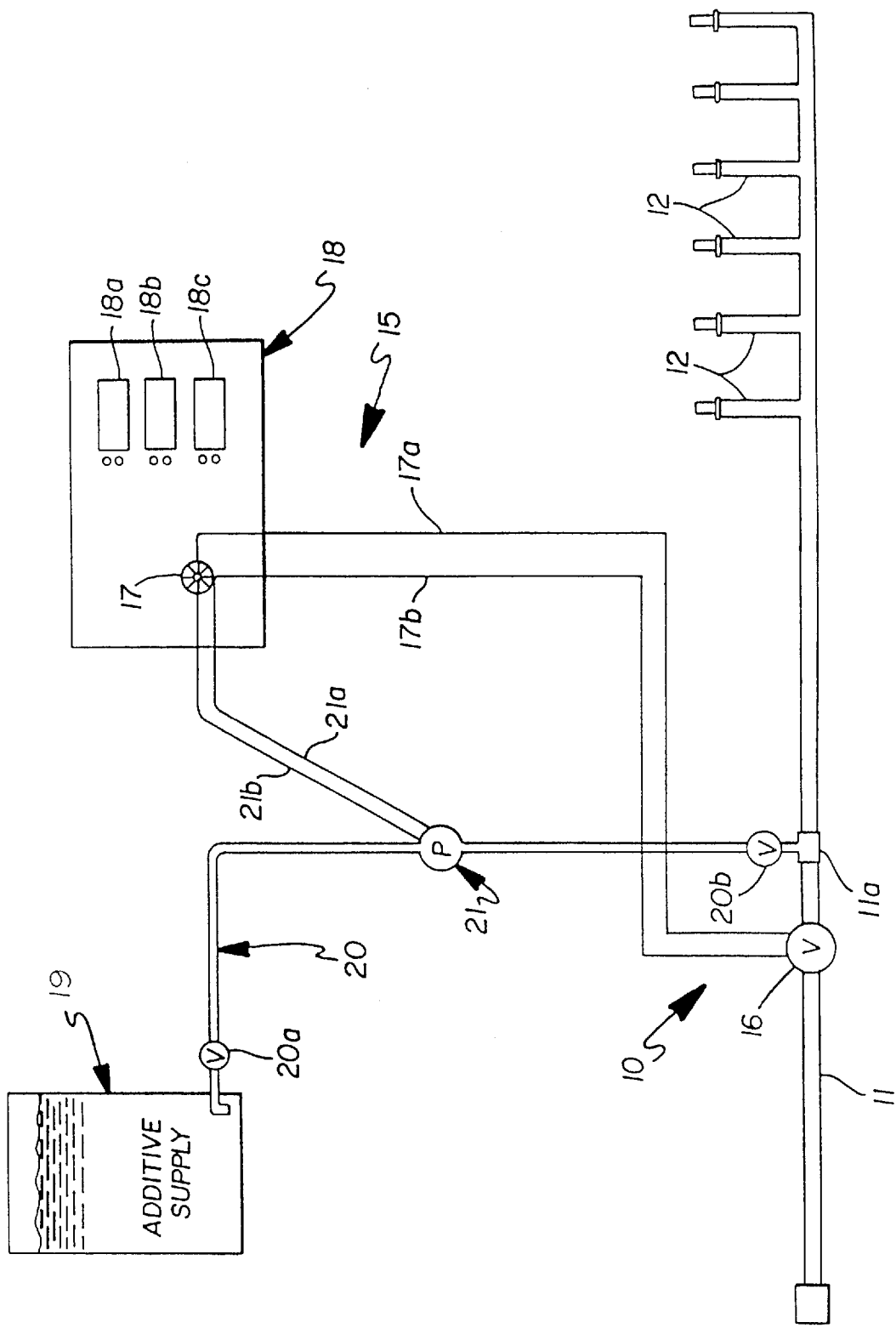
FIG. 1 is a schematic illustration of a typical underground watering system to which applicant's treatment feature has been adapted.

In accordance with the accompanying drawing, a typical underground lawn watering system is generally designated 10 and includes a supply line 11 and a plurality of spray nozzles arranged on separate distribution lines 12. The lines 11, 12 are normally buried and provide a permanent installation. In cases where the watering system is above ground and movable, the distribution lines 12 consist of wheeled units with a flexible connection constituting the supply line 11. In such a wheeled unit, the flow of water is often used to power drive wheels of the unit although drive and movement may be accomplished through other means. Other installations of permanency would include greenhouse systems wherein the watering system is normally mounted above the plant beds.

The applicant's solution addition system is generally designated 15 and includes a flow meter 16 arranged in the supply line 11 and having its output electrically connected through lines 17a, 17b to a readout unit 17 located in a control panel or box 18. The applicant's selected flow meter 16 may include electrical resistance, thermal conductivity, paddle wheel and turbine/propeller types as well as other electro mechanical or magnetic mechanical types, all of which are capable of generating a flow signal with such signal being adapted for microprocessor use.

An additive supply 19 is fluidly connected to the supply line 11 at an additive introduction connector 11a which is downstream of the flow meter 16. The additive connector is a means for introducing the additive solution into the supplied water and may be a single point connection or may include a multiple point connection such as a manifold which will introduce the additive at spaced locations into the water line 11. Connection of the additive supply, whether it consist of single or multiple introduction, prior to the flow meter 16 would not materially effect the function of the flow meter 16 as the amount of additive provided to the flow is minimal in comparison to total liquid flow therethrough. Connection of the supply 19 prior to the flow meter 16 could, however, possibly introduce chemicals into the flow meter which could prove harmful to the operation thereof.

To connect the additive supply 19 to supply line 11 a supply line 20 is provided between the supply 19 and joinder 11a. A first valve 20a in line 20 isolates the additive supply 19 from the system to allow for renewal or replacement thereof A check valve 20b is provided in line 20 to prevent back flow of water from supply line 11 to the additive supply 19. Also arranged in additive line 20 is a metering pump or control 21 to provide controlled metering of the additive which is electrically connected by lines 21a, 21b to control panel 18.

Arranged within control panel or box 18, which is preferably microprocessor operative, are several components which may include additive controls and readout 18a for providing a readout of material being added; additive remaining readout 18b to inform an operator of necessity of replacement of the supply; and a flow readout 18c which simply indicates total flow through the system and to the distribution lines and nozzles 12. Control means, being simple setting control elements may be provided for each of the functions and to act as resets or adjustment features.

Applicant is aware that other readouts and controls may easily be provided in a microprocessor system and these could include flow pressures or flow condition readouts which would indicate any flow stoppages. If, for example, water were being applied daily, it is possible to set the controls to allow for non-daily additive application.

In operation of the unit several advantages exist. As the additive is added to water being applied, it will not lie dormant upon the lawn surface to possibly burn the lawn. Control of the amount of additive will lessen additive runoff. Such runoff has been known to affect nearby waters and may be labeled as a trespassing act upon the property of another. The additive system may provide a standby to operation of the watering system and periodic operation is thus available and controllable.

As previously stated, the applicant's system may be utilized for applying chemicals other than fertilizers and could include bug eliminators, weed controls and, dependent upon granular size of a seed, could be utilized for lawn reseeding or starting purposes.

The primary aspects then, of the applicant's system, is to provide a simplified and easily controlled arrangement for introductions of various substances to lawns or even foodstuffs.

What is claimed is:

1. An automatic additive system for watering systems wherein the system includes at least a water supply line and a plurality of nozzle outlets for spraying water onto a select surface, such system including:
    a) an additive supply;
    b) means for connecting said additive supply to the water supply line of the watering system;
    c) a flow meter in the water supply line generating a signal in response to fluid flow therethrough;
    d) metering means in said additive supply;
    e) control means receiving said generated signal and controlling said metering means in said additive supply; and
    f) means for adjusting said control means to provide for additive supply introduction through said additive supply.

2. The automatic additive system for watering systems as set forth in claim 1 and,
    g) check valve means in said additive supply connecting means to prevent back flow from the watering system to said additive supply.

3. The automatic additive system for watering systems as set forth in claim 1 and said flow meter including an electrical resistance device to generate a signal in response to fluid flow.

4. The automatic additive system for watering systems as set forth in claim 1 and said flow meter including a thermal conductive device for generating a signal in response to fluid flow.

5. The automatic additive system for watering systems as set forth in claim 1 and said flow meter including electro mechanical and magnetic mechanical devices for generating a signal in response to fluid flow.

6. The automatic additive system for watering systems as set forth in claim 1 and said means for connecting said additive supply to the water supply is arranged down stream from said flow meter.

7. The automatic additive system for watering systems as set forth in claim 1 wherein said means for adjusting said control means includes means for setting times for introduction of additive to the watering system.

8. The automatic additive system for watering systems as set forth in claim 1 wherein said means for adjusting said control means includes means for determining the amount of additive remaining in said additive supply.

9. The automatic additive system for watering systems as set forth in claim 1 wherein said generated signal includes total flow indication.

10. The automatic additive system for watering systems as set forth in claim 1 and said metering means in said additive supply means includes a metering pump receiving operational signals from said control means.

11. The additive system for water delivery systems as set forth in claim 1 wherein said additive supply connecting means includes at least two spaced locations for introducing additive to the water supply line.

12. The additive system for water delivery systems as set forth in claim 1 wherein said additive supply connecting means includes a manifold having a plurality of introduction ports spaced along the water supply line.

13. An automatic additive system for watering systems wherein the system includes at least a water supply line and at least one nozzle outlet for spraying water onto a select surface, such system including:
    a) an additive supply;
    b) means for connecting said additive supply to the water supply line of the watering system;
    c) a flow meter in the water supply line generating a signal in response to fluid flow therethrough;
    d) metering means in said additive supply;
    e) control means receiving said generated signal and controlling said metering means in said additive supply; and
    f) means for adjusting said control means to provide for additive supply introduction through said additive supply.

* * * * *